(12) United States Patent
Cai et al.

(10) Patent No.: US 9,088,950 B2
(45) Date of Patent: Jul. 21, 2015

(54) METHOD AND SYSTEM FOR THE CONTROL OF DISCONTINUOUS RECEPTION IN A WIRELESS NETWORK

(71) Applicant: BlackBerry Limited, Waterloo (CA)

(72) Inventors: Zhijun Cai, Euless, TX (US); James Earl Womack, Bedford, TX (US); Takashi Suzuki, Ichikawa (JP); Gordon Peter Young, Shipston-on-Stour (GB)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 14/315,417

(22) Filed: Jun. 26, 2014

(65) Prior Publication Data

US 2014/0307606 A1    Oct. 16, 2014

Related U.S. Application Data

(63) Continuation of application No. 13/244,720, filed on Sep. 26, 2011, which is a continuation of application No. 12/430,333, filed on Apr. 27, 2009, now Pat. No. 8,432,843.

(60) Provisional application No. 61/047,964, filed on Apr. 25, 2008.

(51) Int. Cl.
*H04W 52/02* (2009.01)
*H04W 76/04* (2009.01)

(52) U.S. Cl.
CPC .......... *H04W 52/0251* (2013.01); *H04W 52/02* (2013.01); *H04W 76/048* (2013.01)

(58) Field of Classification Search
CPC .............. H04W 76/048; H04W 52/02; H04W 52/0251
See application file for complete search history.

(56) References Cited

U.S. PATENT DOCUMENTS

| 8,320,287 | B2 * | 11/2012 | Cai et al. ........................ 370/311 |
| 8,432,843 | B2 | 4/2013 | Cai et al. |
| 2004/0100940 | A1 | 5/2004 | Kuure et al. |
| 2007/0168826 | A1 | 7/2007 | Terry et al. |

(Continued)

FOREIGN PATENT DOCUMENTS

| EP | 1641294 A1 | 3/2006 |
| EP | 1855410 A2 | 11/2007 |

(Continued)

OTHER PUBLICATIONS

International Preliminary Report on Patentability for PCT/US2009/041769, dated Aug. 18, 2010 (14 pgs.).

(Continued)

*Primary Examiner* — Christopher Grey
(74) *Attorney, Agent, or Firm* — Fish & Richardson P.C.

(57) ABSTRACT

Methods and apparatus for controlling discontinuous reception on a mobile device and in particular to control a short discontinuous reception timer in response to receipt of a medium access control element. The methods and apparatus include stopping, restarting or maintaining the short discontinuous reception timer. Methods and apparatus for limiting or stopping a retransmission timer by providing user equipment with a maximum retry value for transmissions, by providing a maximum redundant version value, or by providing a medium access control element to stop or prevent the start of a retransmission timer.

17 Claims, 14 Drawing Sheets

(56) References Cited

U.S. PATENT DOCUMENTS

| | | |
|---|---|---|
| 2007/0291728 A1 | 12/2007 | Dalsgaard et al. |
| 2008/0181127 A1* | 7/2008 | Terry et al. .................... 370/252 |
| 2008/0186892 A1 | 8/2008 | Damnjanovic |
| 2009/0016252 A1 | 1/2009 | Ho et al. |
| 2009/0147726 A1 | 6/2009 | Tseng |
| 2009/0232054 A1 | 9/2009 | Wang et al. |
| 2009/0232118 A1 | 9/2009 | Wang et al. |
| 2009/0238105 A1 | 9/2009 | Wu et al. |
| 2012/0014304 A1 | 1/2012 | Cai et al. |
| 2013/0265923 A1* | 10/2013 | Wang et al. ................... 370/311 |

FOREIGN PATENT DOCUMENTS

| | | |
|---|---|---|
| KR | 10-2011-0007223 | 1/2011 |
| WO | 2007148175 | 12/2007 |
| WO | 2009132329 | 10/2009 |

OTHER PUBLICATIONS

Ericsson, Clarification of DRX, RS-083895, 3GPP TSG-RAN2 Meeting #62bis, Jul. 4, 2008, Warsaw, Poland (4 pgs.).
Office Action, mailed Jun. 4, 2010 for U.S. Appl. No. 12/407,958, filed Mar. 20, 2009 (12 pgs.).
Ericsson, "Details of MAC DRX Control," TSG-RAN WG2 Meeting #61 (R2-080934), XP-002532356, Feb. 11-15, 2008, Sorento, Italy (6 pgs.).
International Preliminary Report on Patentability for PCT/US2009/037760, dated Sep. 30, 2010 (11 pgs.).
Written Opinion for PCT/US2009/037760, dated Jul. 2, 2009 (19 pgs.).
3GPP TS 36.321 v8.1.0 (Mar. 2008), $3^{rd}$ Generation Partnership Project; Technical Specification Group Radio Access Network Evolved Universal Terrestrial Radio Access (E-UTRA), Medium Access Control (MAC) protocol specification (Release 8) (30 pgs.).
Research in Motion Limited, "Go to Long Sleep Command for LTE DRX," 3GPP TSG-RAN-WG2 Meeting #61 bis, Mar. 21-Apr. 4, 2008 (R2-081868) XP-002532357, Shenzhen, China (4 pgs.).
Korean Office Action for KR 10-2010-7026456 dated Jan. 31, 2012 (9 pgs. including translation).
Advisory Action of U.S. Appl. No. 12/407,958, dated Jun. 28, 2011 (3 pgs.).
International Search Report, dated Jan. 28, 2010 for International Application No. PCT/US2009/041769, dated Apr. 27, 2009 (14 pgs.).
Office Action for U.S. Appl. No. 12/407,958, dated Feb. 23, 2011 (5 pgs.).
Office Action for U.S. Appl. No. 12/430,333, dated Oct. 27, 2011 (18 pgs.).
Office Action for U.S. Appl. No. 12/407,958 dated Feb. 16, 2012 (20 pgs.).
Office Action for U.S. Appl. No. 12/407,958 dated Aug. 10, 2011 (17 pgs.).
Office Action, dated Jan. 19, 2011, in European Application No. 09734680.3, filed Nov. 22, 2010 (2 pgs.).
Chinese Office Action mailed Sep. 29, 2013, in Chinese Application No. 200980123660.6 (4 pgs.) and English translation (5 pgs.).
European Communication dated May 17, 2013, issued in European Application No. 09734680.3 (3 pgs.).
Japanese Office action dated Mar. 26, 2013, issued in Japanese Application No. 2011-506490 (2 pgs.).
Canadian Office Action dated Jan. 16, 2013, issued Canadian Patent Application No. 2,722,561 (3 pgs.).
Chinese Office Action dated Jan. 17, 2013, issued in Chinese Application No. 200980123660.6 (6 pgs.).
Nokia Corporation, Nokia Siemens Networks, "Stage 3 Description of DRX," 3GPP TSG-RAN WG2 #60 bis, Jan. 18, 2008 (R2-080552) (7 pgs.).
Advisory Action issued in U.S. Appl. No. 12/430,333, dated Jun. 19, 2012, 2 pages.
Advisory Action issued in U.S. Appl. No. 13/244,720, dated Apr. 18, 2013, 2 pages.
Advisory Action issued in U.S. Appl. No. 13/244,720, dated Jun. 18, 2012, 6 pages.
Final Office Action issued in U.S. Appl. No. 12/430,333, dated Dec. 3, 2012, 12 pages.
Final Office Action issued in U.S. Appl. No. 13/244,720, dated Feb. 8, 2013, 19 pages.
Final Office Action issued in U.S. Appl. No. 13/244,720, dated Jan. 15, 2015, 12 pages.
Non-final Office Action issued in U.S. Appl. No. 13/244,720, dated Aug. 9, 2012, 18 pages.
Non-final Office Action issued in U.S. Appl. No. 13/244,720, dated Nov. 21, 2014, 27 pages.
Non-final Office Action issued in U.S. Appl. No. 12/430,333, dated Aug. 21, 2012, 16 pages.
Notice of Allowance issued in U.S. Appl. No. 12/430,333, dated Mar. 18, 2013, 10 pages.
Notice of Allowance issued in CA Application No. 2,722,561, dated Mar. 13, 2014, 1 page.
Notice of Allowance issued in CN Application No. 200980123660.6, dated Sep. 3, 2014, 4 pages.
Office Action issued in CN Application No. 200980123660.6, dated Apr. 11, 2014, 4 pages.
Final Office Action issued in U.S. Appl. No. 12/430,333, dated Apr. 10, 2012, 15 pages.
Final Office Action for U.S. Appl. No. 13/244,720, dated Mar. 26, 2012, 15 pages.
Non-final Action for U.S. Appl. No. 13/244,720, dated Nov. 8, 2011, 19 pages.
Japanese Office Action issued in Application No. 2011-506490, dated Nov. 14, 2012, 7 pages. (with English translation).
Japanese Office Action issued in Application No. 2013-035398, dated Jan. 27, 2014, 2 pages. (no translation available).
Korean Office Action issued in Application No. 10-2012-7008559, dated Jun. 22, 2012, 9 pages. (with English translation).

* cited by examiner

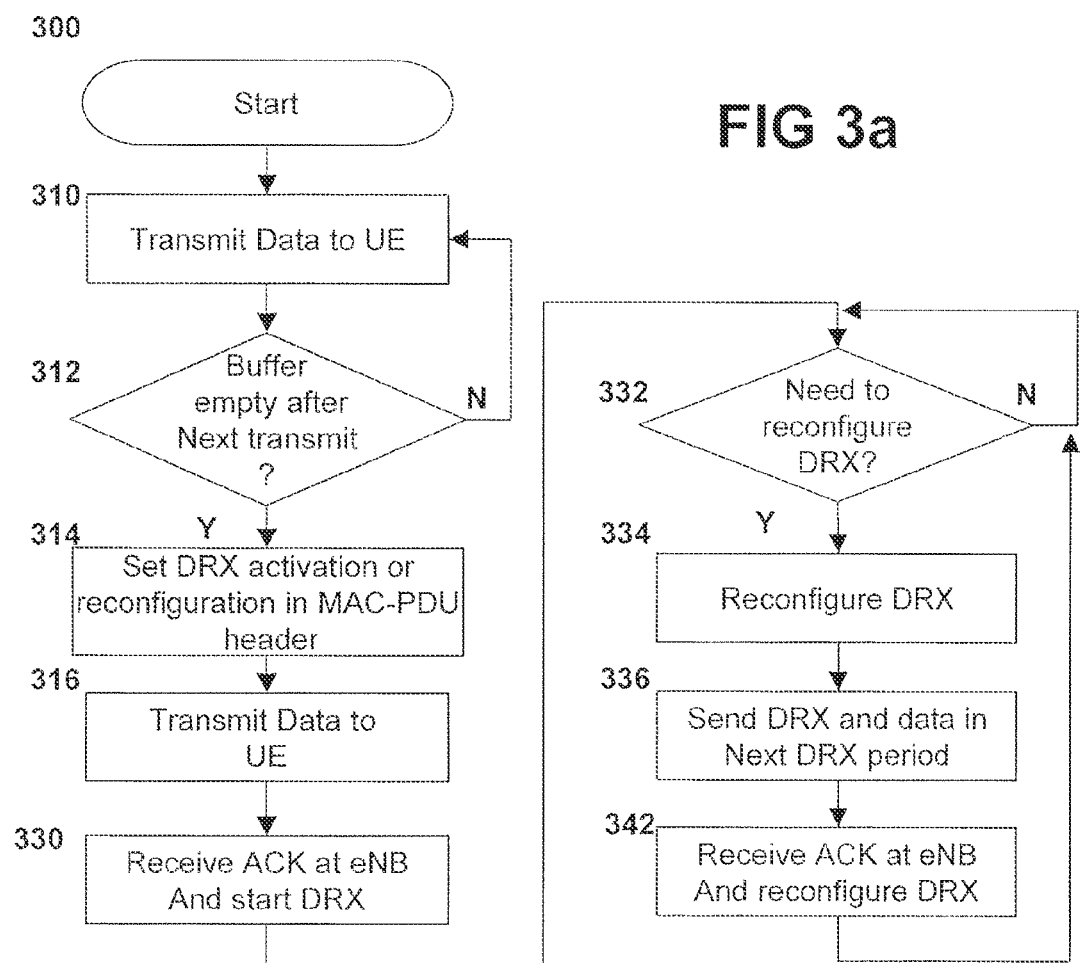

METHOD AND SYSTEM FOR THE CONTROL OF DISCONTINUOUS RECEPTION IN A WIRELESS NETWORK

CROSS-REFERENCE TO RELATED APPLICATIONS

The present application is a continuation of U.S. application Ser. No. 12/430,333, filed Apr. 27, 2009, which claims the benefit of U.S. Provisional Patent Application 61/047964; filed Apr. 25, 2008, the entire disclosures of which are incorporated by reference herein in their entirety.

FIELD OF THE DISCLOSURE

The present disclosure relates to the long term evolution (E-UTRA) of Third Generation Partnership Project (3GPP), and in particular to discontinuous reception (DRX) for user equipment (UE) in the E-UTRA infrastructure.

BACKGROUND

In the long term evolution infrastructure, a UE can be in one of two radio resource control (RRC) states. These are LTE_IDLE and LTE_ACTIVE.

The UE can be configured for discontinuous reception (DRX) in both the LTE_IDLE and the LTE_ACTIVE states. DRX allows the UE to synchronize its listening period to a known paging cycle of the network. By synchronizing the listening period with acceptable transmission times from the network, the UE can turn off its radio transceiver when the network will not schedule transmissions, thereby significantly saving battery resources. As will be appreciated by those skilled in the art, unless a UE is used extensively, a large drain on its battery comes from the standby cycle in which it monitors the paging channel (or control channels) and measures serving and neighboring cells. DRX parameters allow the mobile to synchronize with the network and to know that it will not receive another signal until a specified time has elapsed.

Utilizing DRX in an IDLE state is performed in present UMTS systems and is done by the network signaling to the UE a DRX parameter and synchronizing the UE and the network.

In an ACTIVE state however, various issues exist for turning off the receiver based on a DRX parameter. This includes the fact that only network controlled handover is allowed in the LTE_ACTIVE state. Also, other issues include efficient signaling of activation and deactivation of DRX, measurement requirements of network signals during the DRX, handling of missed handover opportunities, and issues dealing with the length of the DRX value in which entity in the network can request DRX activation and reconfiguring the DRX period.

Further issues involve configuration and control of various timers for long DRX.

BRIEF DESCRIPTION OF THE DRAWINGS

The present application will be better understood with reference to the drawings, in which:

FIG. 3a is a flow chart showing a method to activate deactivate and reconfigure DRX period using a MAC-PDU header from the eNB side;

FIG. 9 is a block diagram of an exemplary mobile device apt to be used with the present disclosure; and . . . .

DETAILED DESCRIPTION OF THE DRAWINGS

Figure 1:
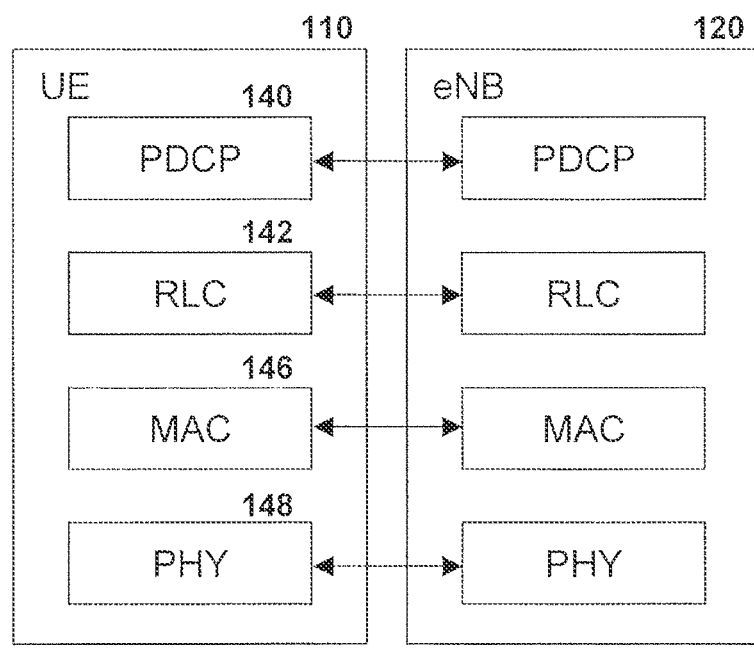
FIG. 1 is a block diagram showing a long term evolution user plane protocol stack.

The present disclosure provides various methods and systems for addressing the deficiencies in the prior art regarding DRX in an LTE_ACTIVE state.

The present disclosure provides a method to control a short discontinuous reception 'DRX' timer comprising: receiving a medium access control element; checking whether a short DRX cycle is configured; stopping the short DRX timer responsive to the checking; and utilizing a long DRX cycle.

The present disclosure further provides a method to control a short discontinuous reception 'DRX' timer comprising: receiving a medium access control element; checking whether a short DRX cycle is configured; and restarting the short DRX timer responsive to the checking.

The present disclosure still further provides a method to control a short discontinuous reception 'DRX' timer comprising: receiving a medium access control element; checking whether a short DRX cycle is running; and maintaining the short DRX timer responsive to the checking.

The present disclosure further provides a user equipment adapted to control a short discontinuous reception 'DRX' timer comprising: a communications subsystem adapted to communicate with a network element and to further receive a medium access control element; and a processor, said processor adapted to check whether a short DRX cycle is configured and responsive to the checking to stop the short DRX timer and transition the user equipment to a long DRX cycle.

The present disclosure further provides a user equipment adapted to control a short discontinuous reception 'DRX' timer comprising: a communications subsystem adapted to communicate with a network element and to further receive a medium access control element; and a processor, said processor adapted to check whether a short DRX timer is running and responsive to the checking to restart the short DRX timer.

The present disclosure further provides a user equipment adapted to control a short discontinuous reception 'DRX' timer comprising: a communications subsystem adapted to communicate with a network element and to further receive a medium access control element; and a processor, said processor adapted to check whether a short DRX cycle is configured and responsive to the checking to maintain the short DRX timer.

The present disclosure further provides a method to prevent a retransmission timer from starting, comprising: receiving a value for a maximum number of downlink transmissions for a hybrid acknowledgement request process; checking whether the number of downlink transmissions for the hybrid acknowledgement request process equals or exceeds the value; and responsive to the checking, preventing the retransmission timer from starting.

The present disclosure further provides a method to prevent a retransmission timer from starting, comprising: receiving a value for a specific redundant version; checking whether the redundant version for the hybrid acknowledgement request process equals the value; and responsive to the checking, preventing the retransmission timer from starting.

The present disclosure further provides a method to prevent a retransmission timer from starting, comprising: receiving an expiration value for a number of downlink transmissions for a hybrid acknowledgement request process; checking whether the number of downlink transmissions for the hybrid acknowledgement request process equals or exceeds the expiration value; and responsive to the checking, preventing the retransmission timer from starting.

The present disclosure further provides a method to limit a duration of a retransmission timer or to prevent the start of the retransmission timer comprising: receiving a discontinuous reception medium access control element; identifying a hybrid acknowledgement request process corresponding to the discontinuous reception medium access control element; and preventing the start of, or stopping, the retransmission timer for the hybrid acknowledgement request process.

The present disclosure further provides a user equipment adapted to prevent a retransmission timer from starting, comprising: a communication subsystem adapted to receive a value for a maximum number of downlink transmissions for a hybrid acknowledgement request process; and a processor adapted to check whether the number of downlink transmissions for the hybrid acknowledgement request process equals or exceeds the value and responsive to the check the processor adapted to prevent the retransmission timer from starting.

The present disclosure further provides a user equipment adapted to prevent a retransmission timer from starting, comprising: a communications subsystem adapted to receive a value for a specific redundant version; and a processor adapted to check whether the redundant version for the hybrid acknowledgement request process equals to the value and responsive to the checking, the processor adapted to prevent the retransmission timer from starting.

The present disclosure further provides a user equipment adapted to prevent a retransmission timer from starting, comprising: a communication subsystem adapted to receive an expiration value for a number of downlink transmissions for a hybrid acknowledgement request process; and a processor adapted to check whether the number of downlink transmissions for the hybrid acknowledgement request process equals or exceeds the expiration value and responsive to the check the processor is adapted to prevent the retransmission timer from starting.

The present disclosure further provides a user equipment adapted to limit a duration of a retransmission timer or to prevent the start of the retransmission timer comprising: a communications subsystem adapted to receive a discontinuous reception medium access control element; and a processor adapted to identify a hybrid acknowledgement request process corresponding to the discontinuous reception medium access control element, the processor further adapted to prevent the start of, or to stop, the retransmission timer for the hybrid acknowledgement request process.

Reference is now made to the drawings. FIG. 1 shows a block diagram illustrating the long-term evolution (LTE) user plane protocol stack.

A UE 110 communicates with an evolved Node B (eNB) 120.

Various layers are illustrated in the protocol stack. The packet data convergence protocol (PDCP) layer 140 is illustrated both on the UE 110 and on eNB 120. The PDCP layer 140 performs Internet protocol (IP) header compression and decompression, encryption of user data, transfer of user data and maintenance of PDCP sequence numbers (SN) for radio bearers.

Below the PDCP layer 140 is the radio link control protocol layer 142, which communicates with the radio link control protocol layer 142 on the eNB 120. As will be appreciated, communication occurs through the physical layer in protocol stacks such as those illustrated in FIGS. 1 and 2. However, RLC-PDUs from the RLC layer 142 of the UE are interpreted by the RLC layer 142 on the eNB 120.

Below RLC layer 142 is the medium access control (MAC) data communication protocol layer 146. As will be appreciated by those skilled in the art, the RLC and MAC protocols form the data link sublayers of the LTE radio interface and reside on the eNB in LTE and user equipment.

The layer 1 (L1) LTE (physical layer 148) is below the RLC/MAC layers 142 and 146. This layer is the physical layer for communications.

Figure 2:
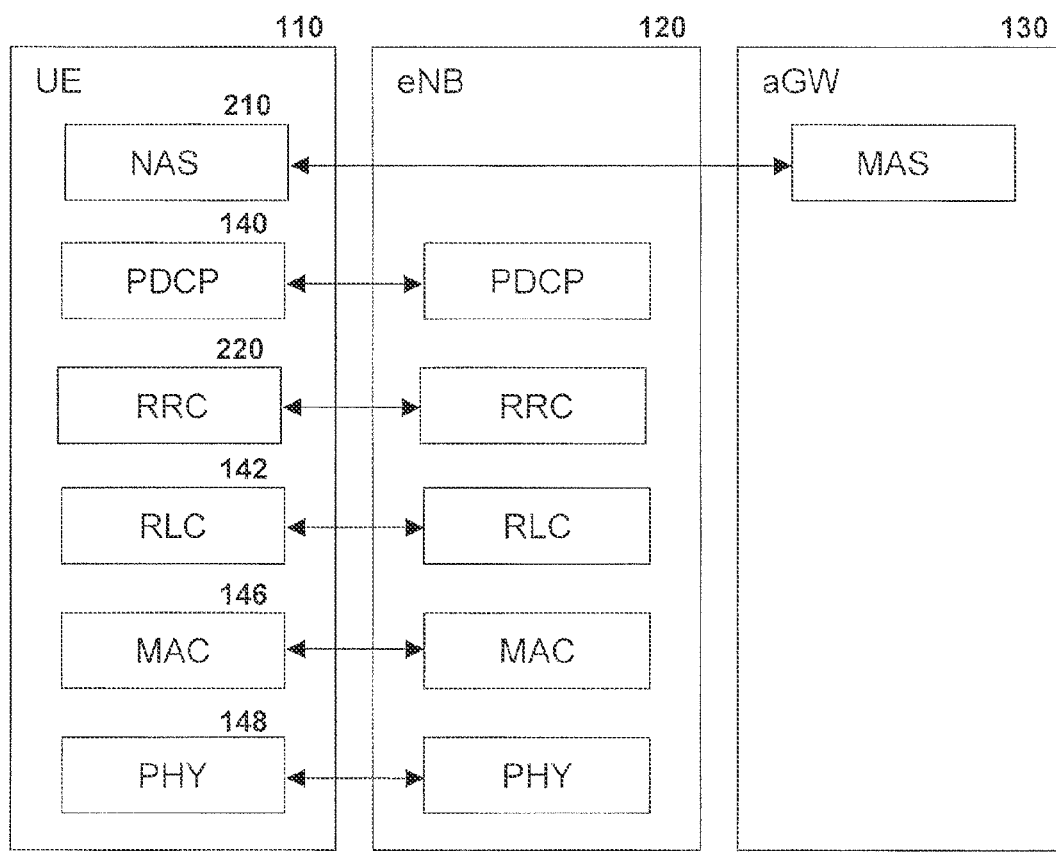
FIG. 2 is a block diagram showing a long term evolution control plane protocol architecture.

Referring to FIG. 2, FIG. 2 illustrates the LTE control plane protocol architecture. Similar reference numerals to those used in FIG. 1 will be used in FIG. 2. Specifically, UE 110 communicates with eNB 120 and an access gateway (aGW) 130. Further, physical layer 148, MAC layer 146, RLC layer 142 and PDCP layer 140 exist within FIG. 2.

FIG. 2 also shows the non-access stratum (NAS) layer 210. As will be appreciated, NAS layer 210 could include mobility management and session management.

The radio resource control protocol layer (RRC) 220, is the part of the protocol stack that is responsible for the assignment, configuration and release of radio resources between the UE and the E-UTRAN (Evolved universal terrestrial radio access network). The basic functionalities of RRC protocol for LTE is described in 3GPP TS 36.331.

As will be appreciated by those skilled in the art, in UMTS, automatic repeat request (ARQ) functionality is carried out within the RLC layer which resides in the radio network controller (RNC). Long Term Evolution (LTE) moves the ARQ functionality from the RNC to eNB where a tighter interaction may exist between the ARQ and the HARQ (within the MAC layer, also located in the eNB).

Various issues regarding DRX in an LTE-ACTIVE state are considered herein.

DRX Signaling Procedure

Very efficient signaling procedures for activating and de-activating DRX and specifying the duration of DRX periods are required in order to support a large population of UEs in a cell that are utilizing DRX in an LTE_ACTIVE state.

As will be appreciated by those skilled in the art, if the evolved node B (eNB) transmits data to the UE during its receiver off period due to a DRX operation, the UE cannot receive the data. Therefore, an indication is required to ensure the UE and the eNB are synchronized regarding when DRX is activated and deactivated.

The indication between the UE and the eNB can be explicit signaling by the radio resource control (RRC) or layer 1/layer 2 (L1/L2) signaling. As will be appreciated, however, explicit signaling may not be as efficient as desired.

A more efficient solution is to include an optional field in the MAC header of a MAC-PDU (MAC Protocol Data Unit) to indicate DRX activation and deactivation. The field preferably indicates the DRX value and timing margin for activation and deactivation. A value of zero, for example, could mean DRX deactivation in the DRX value field in one embodiment. Conversely, if data that is to be transmitted in the next MAC-PDU is the last one in the buffer for the UE, the eNB may extend the MAC header field to include a DRX length initial value. For example, this could be 320 milliseconds. The timing margin is explained below, and is utilized to reduce the consequences of a NACK to ACK or ACK to NACK misinterpretation, for the reception status of the MAC-PDU between the UE and the eNB.

For example, three bits may be added to the MAC header to indicate eight values of the DRX period. Thus, rather than a specific time value being sent, a bit value from 000 to 111 could indicate one of eight discrete values.

In an alternative embodiment, a smaller field in the MAC header could be used (for example two bits) to indicate increment or decrement. The RRC could indicate default values, and if the MAC header indicates increment or decrement then the UE could change to the prespecified value.

For example, a Logical Channel ID field (LCID) for a downlink shared channel (DL-SCH) could be:

| Values of LCID for DL-SCH | |
|---|---|
| Index | LCID values |
| 00000 | CCCH |
| 00001-xxxxx | Identity of the logical channel |
| xxxxx-11011 | Reserved |
| 11100 | [UE Contention Resolution Identity] |
| 11101 | [Timing Advance] |
| 11110 | DRX Command |
| 11111 | Padding |

As indicated above, a DRX Control Element could be 11110 in the Index.

Once the UE receives the DRX value, it acknowledges it to the eNB by transmitting HARQ ACK and starts the DRX at the system frame time considering propagation delay and processing delay at the eNB. When the eNB receives the ACK from the UE, it also starts the DRX at the next system frame time. As will be appreciated, the eNB does not turn off its transceiver, but simply knows not to transmit messages to the individual UE.

During a DRX period, if new data arrives at the eNB, the eNB can send a MAC-PDU with a header extension set to DRX deactivation or a shorter DRX length depending on the amount of data in the buffer or the quality of service requirements. The UE reconfigures the DRX accordingly and acknowledges the MAC-PDU. When the eNB receives the ACK, it reconfigures the DRX. As indicated above, the deactivation could be accomplished by merely setting the length value to zero.

Figure 3B:
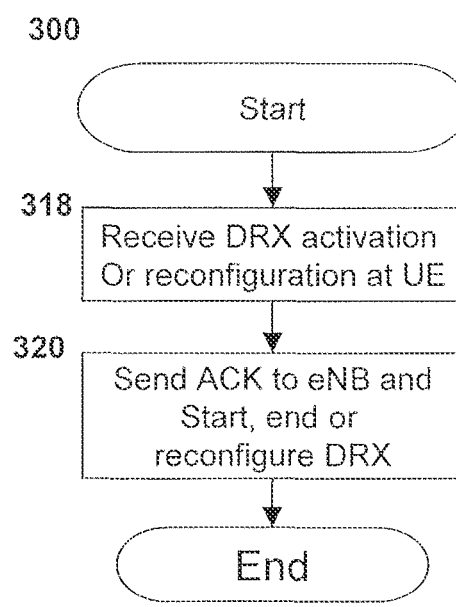
FIG. 3b is a flow chart showing a method to acknowledge the activation, deactivation or reconfiguration of the DRX period from the UE side.

Reference is now made to FIGS. 3a and 3b. FIG. 3a shows an exemplary method for controlling DRX activation in an LTE_ACTIVE state. The process starts at block 300 and proceeds to block 310 in which data is transmitted to the UE. As will be appreciated by those skilled in the art, data transmission in an LTE_ACTIVE state utilizes the MAC-PDU at the data link layer to transmit the data.

The process next proceeds to block 312 in which a check is made to see whether the buffer of data to be sent to the UE will be empty after the next transmit. If no, the process proceeds back to block 310 in which data is transmitted to the UE. Alternatively, if the buffer will be empty after the next transmit and the data arrival rate is lower than a threshold value, the process proceeds to block 314.

In block 314, the eNB sets DRX activation in the MAC-PDU header. As indicated above, this includes a DRX activation value indicating the length of the DRX period. In another embodiment the eNB may simply indicate an increase in the DRX interval. The UE reconfigures the existing DRX interval to a predetermined interval. The predetermined interval may be either known to both eNB and UE or pre-signaled to the UE from the eNB via explicit signaling; either by system broadcast or RRC signaling.

The process then proceeds to block 316 in which the data including the modified MAC-PDU header is sent to the UE.

Reference is now made to FIG. 3b. In block 318, the UE receives the data and sees that DRX activation is specified in the MAC-PDU header. The process proceeds to block 320 in which the UE sends an acknowledgement (ACK) to the eNB and starts the DRX at the system frame time considering propagation delay and processing delay at the eNB.

In block 330 of FIG. 3a, the eNB receives the ACK from the UE and starts the DRX at the next system frame time.

As will be appreciated, the DRX can continue until various events occur which may require the DRX to be adjusted. One event is the reception of data from aGW by the eNB for the UE. Depending on the amount of data received, the DRX can either be deactivated or the period of the DRX can be reduced. Other events that may require the adjustment of the DRX include a change of signal power level between the eNB and the UE or possibly a gradual increase in the DRX cycle due to continued data inactivity, among others. These other events are discussed in more detail below.

In block 332 the eNB checks to see whether the DRX needs to be adjusted. As indicated above, this could be the situation where data is received to be sent to the UE. Here the DRX can either be deactivated or the period adjusted.

From block 332, if the DRX does not need to be adjusted, the process proceeds back to block 332 and continues to check whether or not the DRX needs to be adjusted.

Once the process in block 332 finds that the DRX does need to be adjusted, the process proceeds to block 334 in which it adjusts the DRX. This could be deactivating the DRX by transmitting a zero value for the DRX or a shorter DRX or a longer DRX as required.

The MAC-PDU with the modified header is sent to the UE in block 336. The MAC-PDU in block 336 could also include any data that has been received by the eNB that needs to be transmitted to the UE.

Referring to FIG. 3b, the process then proceeds to block 318 in which the MAC-PDU with modified header is received at the UE. This MAC-PDU with the modified header is referred to herein as the MAC Control Element (CE). The UE recognizes the DRX period is to be adjusted and in block 320 it sends an acknowledgement to the eNB and it adjusts its DRX period at the same system frame time considering propagation delay and processing delay as at the eNB.

Referring to FIG. 3a, in block 342 the eNB receives the ACK and starts the modified DRX period at the appropriate system frame time. The process then proceeds back to block 332 to see whether the DRX needs to be adjusted again.

In one embodiment, a DRX command MAC control element could indicate to a UE to transition to a DRX period. In this case, if the eNB wants the UE to transition to a long DRX period due to lack of uplink and downlink traffic and based on low traffic rates for non real time DRX, under current E-UTRA specifications this requires a change in the DRX configuration to be made with an RRC configuration message. This may be a 'go-to-sleep' command. An issue with this is that if the eNB later receives traffic patterns that require a shorter DRX period, the RRC configuration message will need to be sent again to reconfigure the DRX configuration on the UE.

Instead, a MAC CE could include a "go-to-long-sleep" possibility. Thus, the eNB could provide the UE with an option to go directly to a long DRX period or cycle without a reconfiguration message explicitly being sent.

Figure 4A:
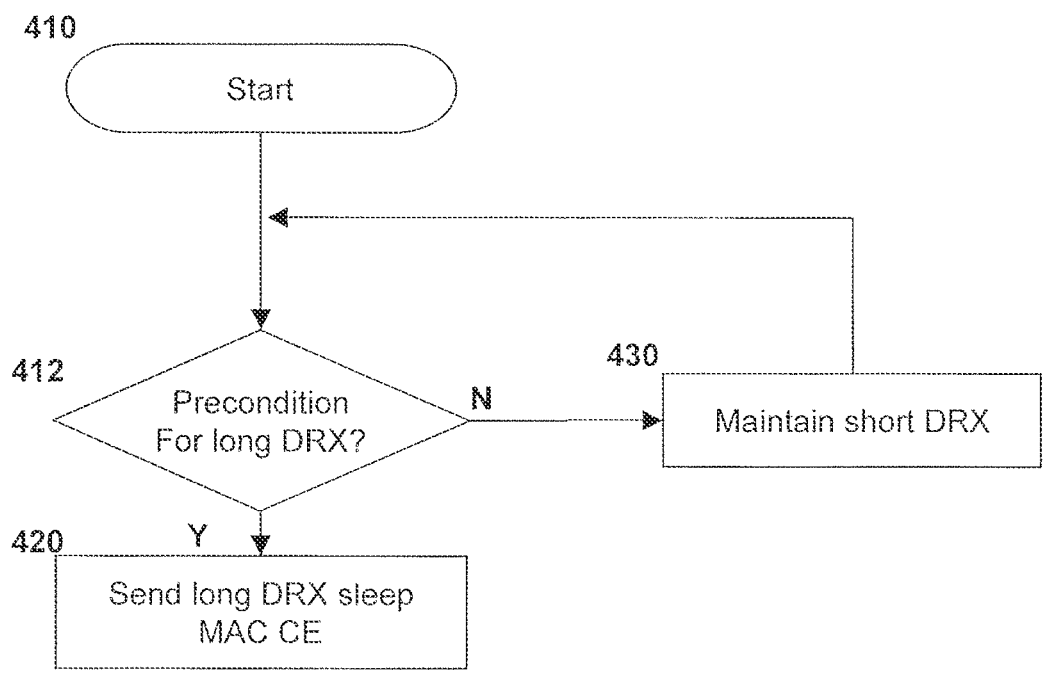
FIG. 4a is a flow chart showing a method to transition directly to long DRX period using a MAC-PDU header from the eNB side.

Reference is now made to FIG. 4a. In FIG. 4a, the process starts at block 410 and proceeds to block 412 in which a check is made to determine whether a precondition for a long DRX cycle exists. As will be appreciated by those skilled in the art, such a precondition could include one or more of: the DRX being configured, a lack of uplink and downlink traffic for the UE, low data transmission to the UE, the position of the UE within a cell and the likelihood of a transition occurring, among others.

If, in block 412, a determination is made that the precondition exists the process proceeds to block 420 in which a long DRX MAC CE is sent to the UE.

Conversely, if the precondition in block 412 does not exist, the process proceeds to block 430 in which the short DRX period is maintained and the process proceeds back to block 412.

Stopping the Short DRX Timer

Figure 4B:
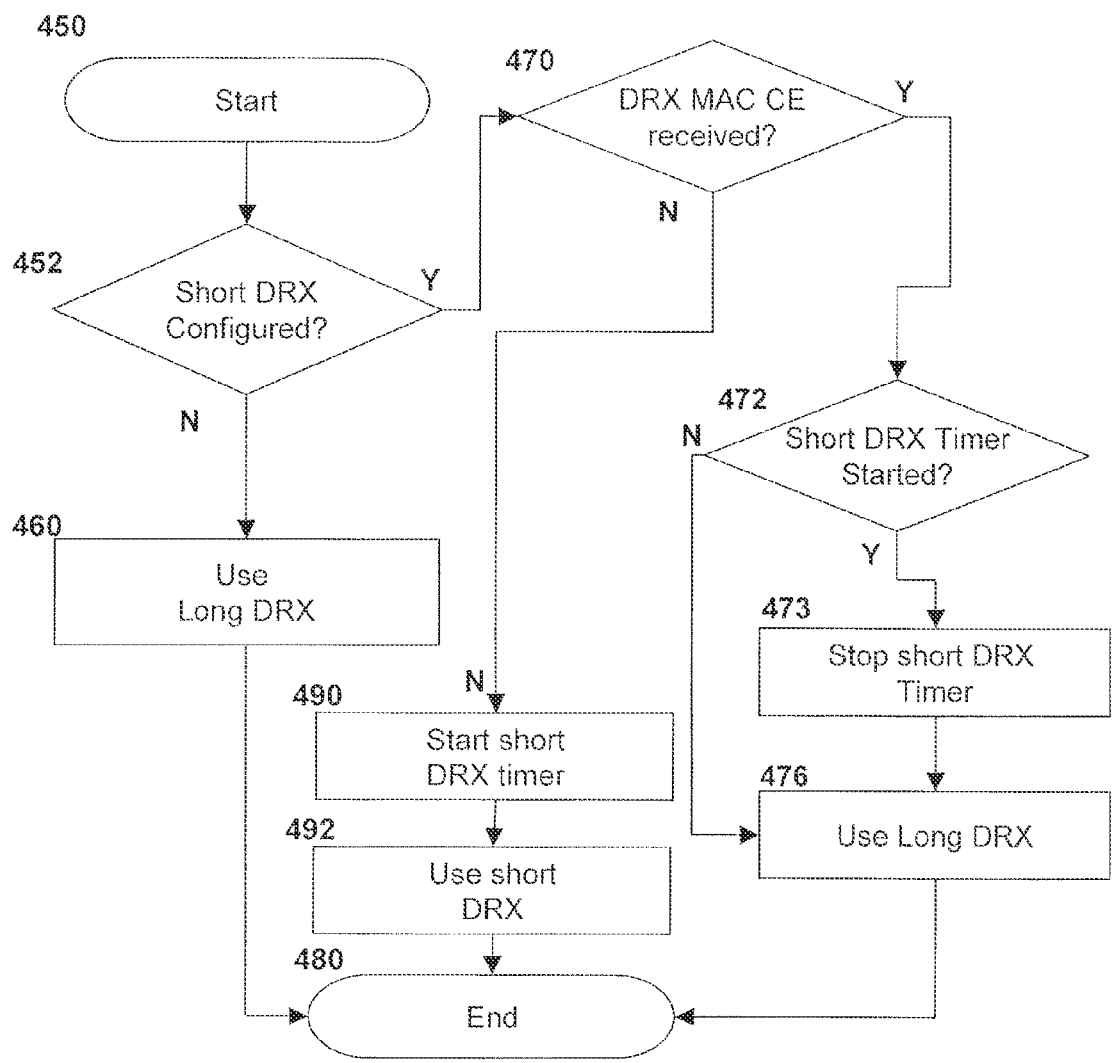
FIG. 4b is a flow chart showing a method to transition directly to a long DRX period from the UE side and stopping the short DRX timer if running.

From the UE perspective, reference is now made to FIG. 4b. The process in FIG. 4b starts at block 450 and proceeds to block 452 in which a check is made to determine whether short DRX cycle is configured. If not, the process proceeds to block 460 in which a long DRX cycle is used.

Conversely, if it is determined in block 452 that short DRX cycle is configured, the process proceeds to block 470 in which a check is made to determine whether a DRX MAC CE command has been received.

From block 470, if a DRX MAC CE command has been received, the process proceeds to block 472 in which a check is made to see whether the short DRX timer is started. If yes, the process proceeds to block 473 in which the short DRX timer is stopped. As will be appreciated, this avoids having a short DRX cycle start on the expiry of the timer.

The process then proceeds to block 476 in which a long DRX cycle is used.

Conversely, if it is determined that the short DRX timer has not been started in block 472, the process proceeds directly to block 476 and uses a long DRX cycle.

Restarting the Short DRX Timer

Alternatively, instead of stopping the short DRX cycle timer at block 473, other options are available. A first is to restart the DRX short cycle timer.

Figure 4C:
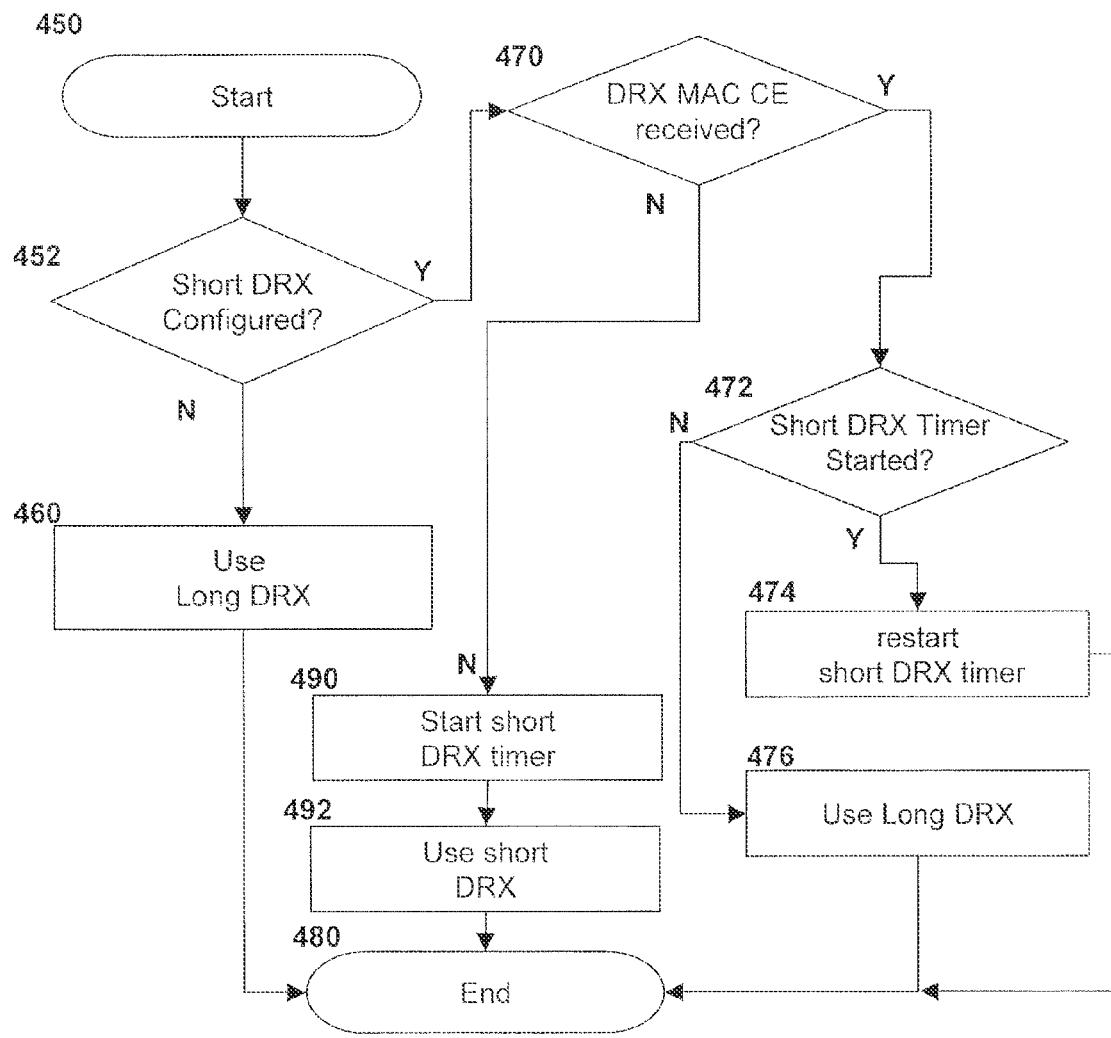
FIG. 4c is a flow chart showing a method to transition directly to a long DRX period from the UE side and resetting the short DRX timer if running.

Reference is now made to FIG. 4c. In FIG. 4c the same blocks as in FIG. 4b are performed, except block 473 from FIG. 4b is replaced with block 474 in FIG. 4c. Block 474 restarts the short DRX timer. As will be appreciated by those in the art, this provides the situation that, if the DRX short cycle timer is already started when receiving the DRX MAC CE, the duration of short DRX is extended. In this case a long DRX cycle is not transitioned to until the expiry of the short DRX timer.

From block 474 the process proceeds to block 480 and ends.

Maintaining the Short DRX Timer

A further alternative option is to keep the current DRX short cycle timer. In this case, the duration of the short DRX cycle is unchanged regardless of the reception of the DRX MAC CE.

Figure 4D:
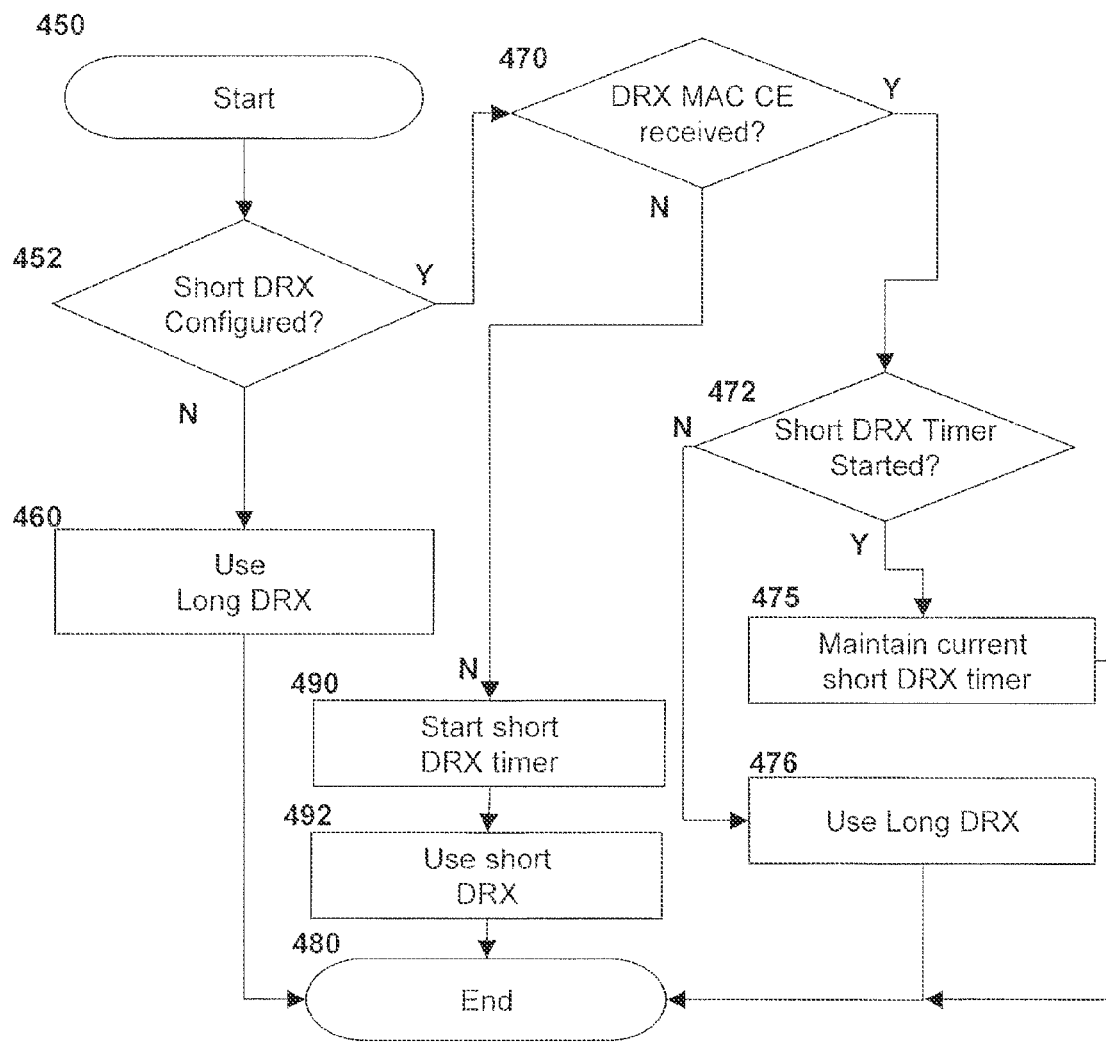
FIG. 4d is a flow chart showing a method to transition directly to a long DRX period from the UE side and maintaining the short DRX timer if running.

Reference is now made to FIG. 4d, which replaces block 473 of FIG. 4b with block 475. In block 475 the process maintains the current short DRX timer. This keeps the current DRX transition time from a short DRX cycle to a long DRX cycle. From block 475 the process proceeds to block 480 and ends.

Under this embodiment, once the DRX short cycle timer expires the UE transitions to a long DRX cycle.

The three embodiments above thus present the options of extending the short DRX cycle period by restarting the DRX short cycle timer, maintaining the current DRX short cycle period by maintaining the current short cycle timer, or transitioning immediately to long DRX by stopping the DRX short cycle timer. From a battery perspective and a network signaling perspective, the maintaining of the current DRX short cycle timer or the transitioning directly to long DRX are preferable. Restarting the DRX short cycle timer extends the short DRX period which utilizes more battery and network resources then a UE in long DRX.

From block 476 the process proceeds to block 480 and ends.

From block 470, if a DRX MAC CE has not been received the process proceeds to block 490 in which a short DRX timer is started. The process then proceeds to block 492 in which the UE uses a short DRX period or cycle. The use of the short DRX timer allows the UE to transition to a long DRX cycle after the timer has expired if no data is received or sent during the timer period.

From block 492 the process proceeds to block 480 and ends.

The above saves battery consumption and network resources when very low traffic is observed by the eNB. The solution provides a more efficient way to transition to a long DRX cycle than by sending RRC level reconfiguration messages.

DRX Retransmission Timer

A further issue for control of DRX is with regard to the retransmission timer. As indicated in 3GPP TS 36.321 a DRX retransmission timer specifies the maximum number of consecutive downlink subframes the UE is to monitor the packet data control channel (PDCCH) for when a downlink retransmission is expected by the UE. It is utilized in situations where a packet has unsuccessfully been received and a retransmission of the packet has been requested.

While waiting for retransmission, an HARQ round trip time (RTT) timer is utilized to allow the UE the ability to turn its radio off during this time. The HARQ RTT timer is a parameter which specifies the minimum amount of subframes before a downlink HARQ retransmission is expected by the UE.

In one embodiment, a counter, referred to herein as a retransmission counter, will count the number of times the retransmission timer is started or stopped by the UE.

Current functionality for discontinuous reception in 3GPP standards includes the following:
When a DRX cycle has been configured, the UE shall for each downlink subframe,
if a HARQ RTT timer expires in this downlink subframe and the data in the soft offer of the corresponding HARQ process was not successfully decoded;
UE shall start the DRX retransmission for the corresponding HARQ process.

The standards further specify that DRX retransmission timers are stopped:
if the PDCCH indicates a DL transmission;
start the HARQ RTT timer for the corresponding HARQ process;
stop the DRX retransmission timer for the corresponding HARQ process.

One problem with the above is in the situation that the MAC PDU is not successfully decoded when the maximum number of transmission or retransmissions is reached. Since the maximum number of retransmissions is reached, the eNB will not send another retransmission; however, the UE will still expect to receive a retransmission. In this case, the DRX retransmission timer will be started, but since the maximum number of transmissions is reached, no retransmission will be sent, and the retransmission timer of the corresponding HARQ process will not be stopped until other new transmission using the same HARQ process is indicated over the PDCCH or the timer is expired. The UE may wake up an additional retransmission window without receiving anything. The consequence of this is that in certain cases the DRX retransmission timer for certain HARQ processes may be running unnecessarily which causes the UE to continue to monitor the PDCCH unnecessarily and the UE to transmit the sounding reference signal (SRS) and channel quality indicator (CQI) and other feedbacks that facilitate more efficient downlink transmissions unnecessarily in the uplink.

Send DRX MAC CE to UE

Various solutions to the above are possible. In a first solution the network may send a DRX MAC control element to the UE.

The reception of DRX MAC CE results in the on-duration timer and inactivity timer being stopped. This could be extended to also stop the retransmission timer.

As will be appreciated by those skilled in the art, stopping the retransmission timer requires identification of the HARQ process. In one embodiment this can be done by including an optional field within the DRX MAC CE. For example, a three bit HARQ process identifier field could be included in the DRX MAC CE.

In an alternative embodiment the UE could stop the retransmission timer with the maximum value or the HARQ process that has the largest number of transmissions.

Figure 5A:
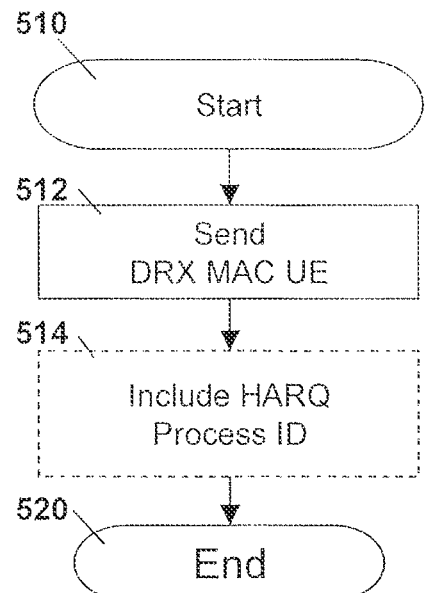
FIG. 5a is a flow chart showing a network side method for signaling that a maximum number of retries has occurred.

Reference is now made to FIG. 5a. FIG. 5a shows a flow diagram of the network side blocks used to send the DRX MAC CE. The process starts at block 510 in which a precondition exists that the maximum number of retries has occurred.

The process then proceeds to block 512 in which a DRX MAC CE is sent to the UE.

Optionally, the process proceeds to block 514 in which the DRX MAC CE sent at block 512 is modified to include an HARQ process identifier.

The process then proceeds to block 520 and ends.

Figure 5B:
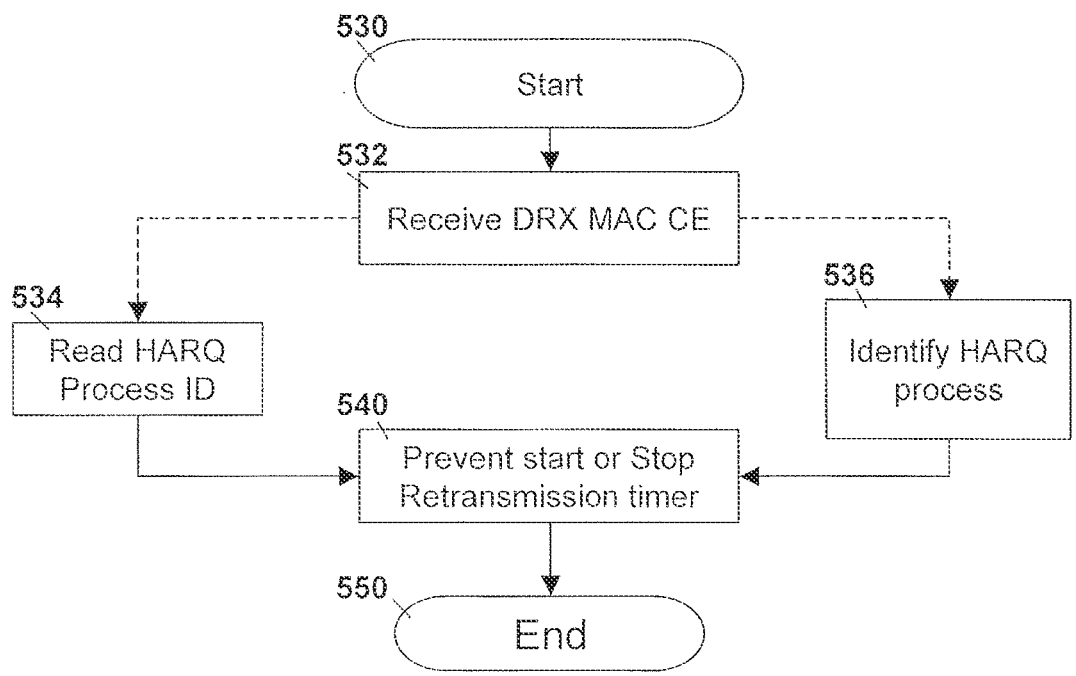
FIG. 5b is a flow chart showing a UE side method for determining whether to start a retransmission timer.

Referring to FIG. 5b, this figure shows the UE side functionality for stopping the retransmission timer. The process starts at block 530 and proceeds to block 532 in which a DRX MAC CE is received at the UE.

If the DRX MAC CE includes the optional extension having the HARQ process identifier, the process proceeds from block 532 to block 534 in which the HARQ process identifier is read from the DRX MAC CE.

Conversely, if the optional field for the process identifier does not exist in the DRX MAC CE, the process proceeds to block 536 in which the process identifies the HARQ process having the maximum number of transmissions or the retransmission timer having the maximum value. Blocks 534 or 536 thus identify the retransmission timer to be stopped or prevented from starting.

From block 534 or 536 the process proceeds to block 540 in which the retransmission timer for the process identified in blocks 534 or 536 is stopped or prevented from starting.

The process then proceeds to block 550 and ends.

As will be appreciated by those in the art, the above prevents a retransmission timer from running after the maximum number of retries has occurred by providing a DRX MAC CE to the UE to indicate that the retransmission timer should not be started or should be stopped.

Providing the Maximum Downlink Retry Value

As a further option, the network could signal the maximum number of downlink transmissions to the UE. In this case, the UE is therefore aware of when to stop or prevent starting the retransmission timer.

Figure 6A:
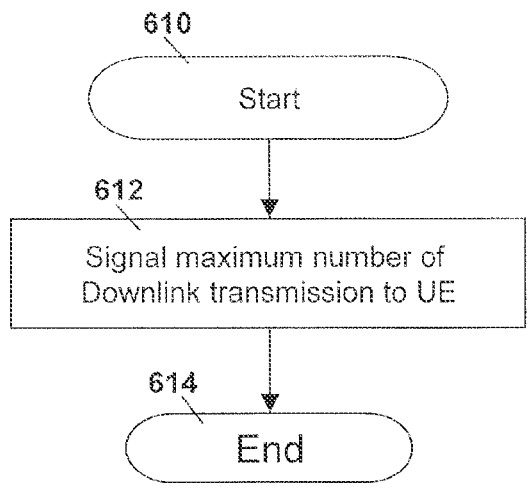
FIG. 6a is a flow chart showing a network side method for signaling that a maximum number of retries has occurred.

Reference is now made to FIG. 6a. FIG. 6a, the network side flow diagram is shown for signaling the maximum number of downlink transmissions to the UE.

The process of FIG. 6a starts at block 610 and proceeds to block 612 in which the maximum number of downlink transmissions is signaled to the UE. As will be appreciated by those skilled in the art, the maximum number of retransmissions can vary based on factors such as the quality of service (QoS) for semi-persistent or "configured" cases. The process then proceeds to block 614 and ends.

Figure 6B:
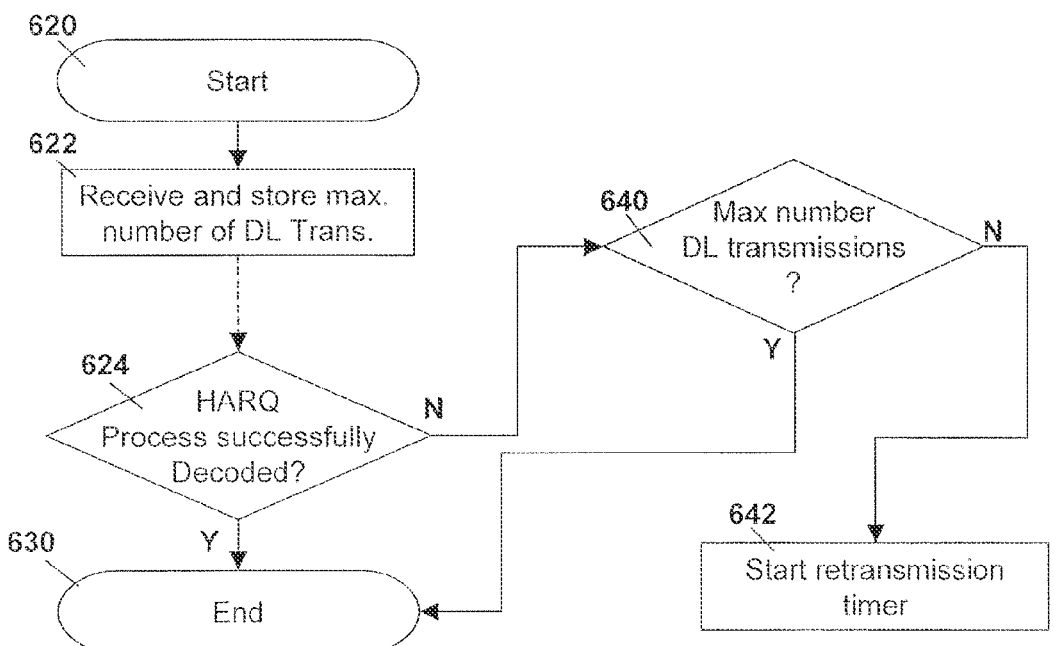
FIG. 6b is a flow chart showing a UE side method for determining whether to start a retransmission timer.

Referring to FIG. 6b, this figure shows the UE side process. The process starts at block 620 and proceeds to block 622 in which the UE receives and stores the maximum number of downlink transmissions possible from the network.

Communication proceeds as normal and eventually reaches block 624 in which a check to made to determine whether a HARQ process has been successfully decoded. If yes, the process proceeds to block 630 and ends. Alternatively, the process could continue to receive and decode HARQ processes.

If it is determined in block 624 that the HARQ process has not been successfully decoded the process proceeds to block 640 and checks whether the maximum number of downlink transmissions for that process has been reached. This could done by utilizing a retransmission counter as described above to determine the number of retransmissions that have occurred. If yes, the process proceeds to block 630 and ends.

Conversely, if the maximum number of downlink transmissions has not been reached as determined in block 640 the process proceeds to block 642 and the retransmission timer is started pursuant to the current standards.

The above therefore prevents the starting of the retransmission timer when no further retransmissions will occur.

Providing an Expiration Retry Value

As a further option, the network could signal an expiration value to the UE, signaling the number of times a UE should start the retransmission timer for a given HARQ process. The expiration value relates to the retransmission counter, which counts the number of times the retransmission timer is started. In this case, the UE is therefore aware of when to stop or prevent starting the retransmission timer.

As will be appreciated by those in the art, the expiration value can be set by the network. Thus a network operator can determine that for certain services such as voice over internet protocol, the starting of a retransmission timer more than a certain number of times will lead to a bad user experience, and thus can set the expiration value to limit the number of times the retransmission timer starts.

In one embodiment the expiration retry value is less than the maximum downlink retry value.

Figure 7A:
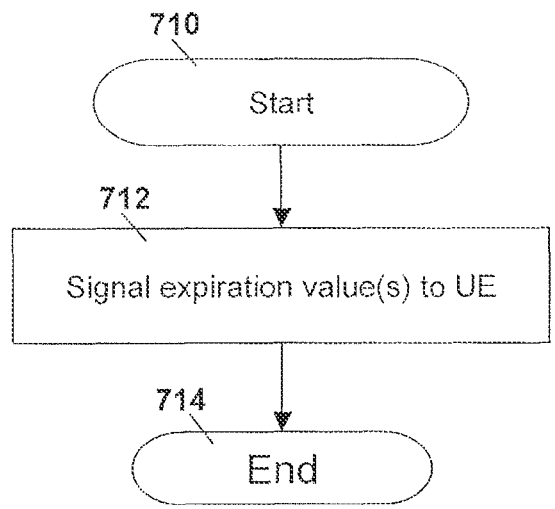
FIG. 7a is a flow chart showing a network side method for signaling that an expiration value for a number of retries.

Reference is now made to FIG. 7a. FIG. 7a, the network side flow diagram is shown for signaling the expiration value to the UE. In one embodiment a different expiration value can be set for different types of HARQ processes.

The process of FIG. 7a starts at block 710 and proceeds to block 712 in which the expiration value or values are signaled to the UE. The process then proceeds to block 714 and ends.

Figure 7B:
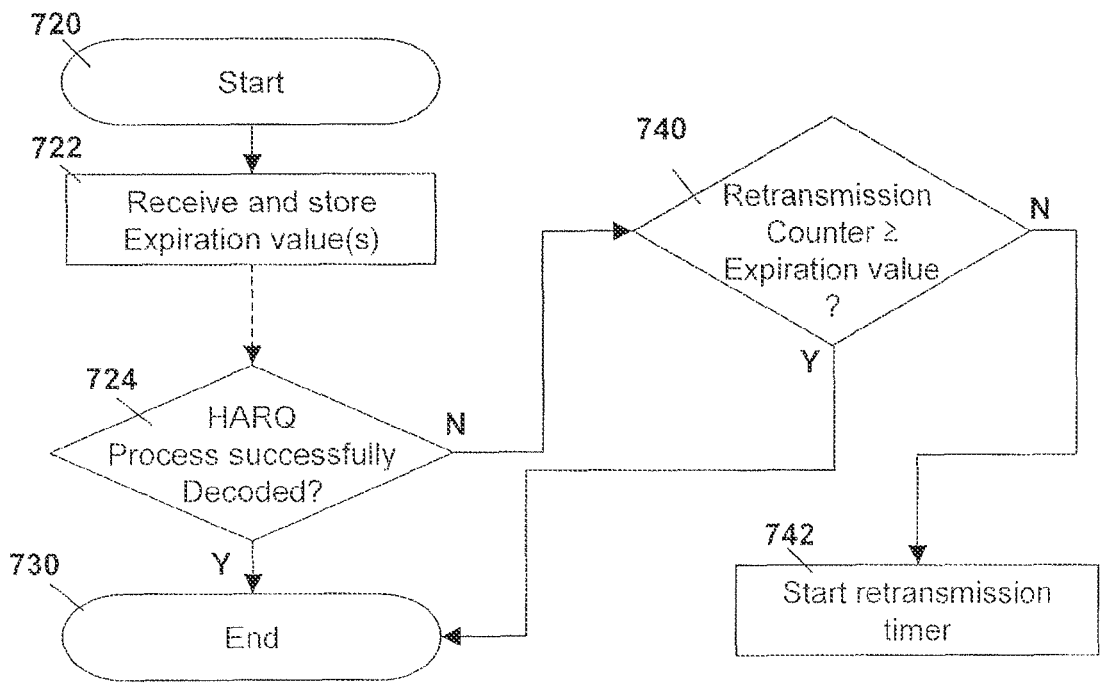
FIG. 7b is a flow chart showing a UE side method for determining whether to start a retransmission timer.

Referring to FIG. 7b, this figure shows the UE side process. The process starts at block 720 and proceeds to block 722 in which the UE receives and stores the expiration value or values from the network.

Communication proceeds as normal and eventually reaches block 724 in which a check to made to determine whether a HARQ process has been successfully decoded. If yes, the process proceeds to block 730 and ends. Alternatively, the process could continue to receive and decode HARQ processes.

If it is determined in block 724 that the HARQ process has not been successfully decoded, the process proceeds to block 740 and checks whether the number of retransmissions matches or exceeds the expiration value for the HARQ process. This could be done by utilizing a retransmission counter as described above to determine the number of retransmissions that have occurred. If yes, the process proceeds to block 730 and ends.

Conversely, if the number of retransmissions does not match or exceed the expiration value for the HARQ process, as determined in block 740 the process proceeds to block 742 and the retransmission timer is started pursuant to the current standards.

The above therefore prevents the starting of the retransmission timer when an expiration value has been reached.
Providing the a Specific Redundant Version Number As a further option, instead of signaling a maximum number of downlink transmissions, the UE could instead be signaled a specific redundant version number associated with the last retransmission so the UE is aware when it is the last retransmission from the network.

Figure 8A:
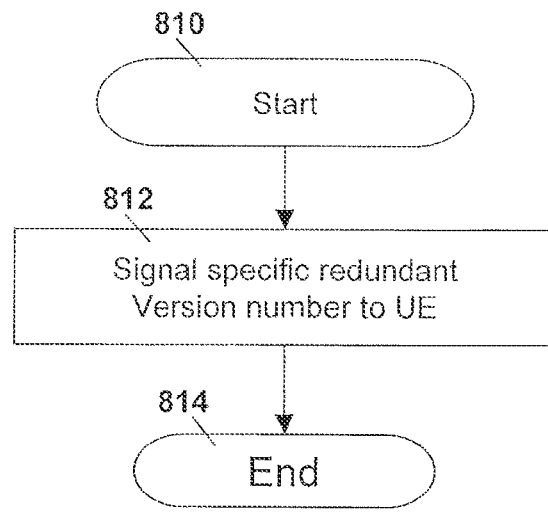
FIG. 8a is a flow chart showing a network side method for signaling a maximum redundant version number.

Reference is now made to FIG. 8a. FIG. 8a shows a process from a network perspective for signaling a specific redundant version number associated with the last retransmission. The process starts at block 810 and proceeds to block 812 in which the specific redundant version number is signaled to the UE. The process then proceeds to block 814 and ends.

Figure 8B:
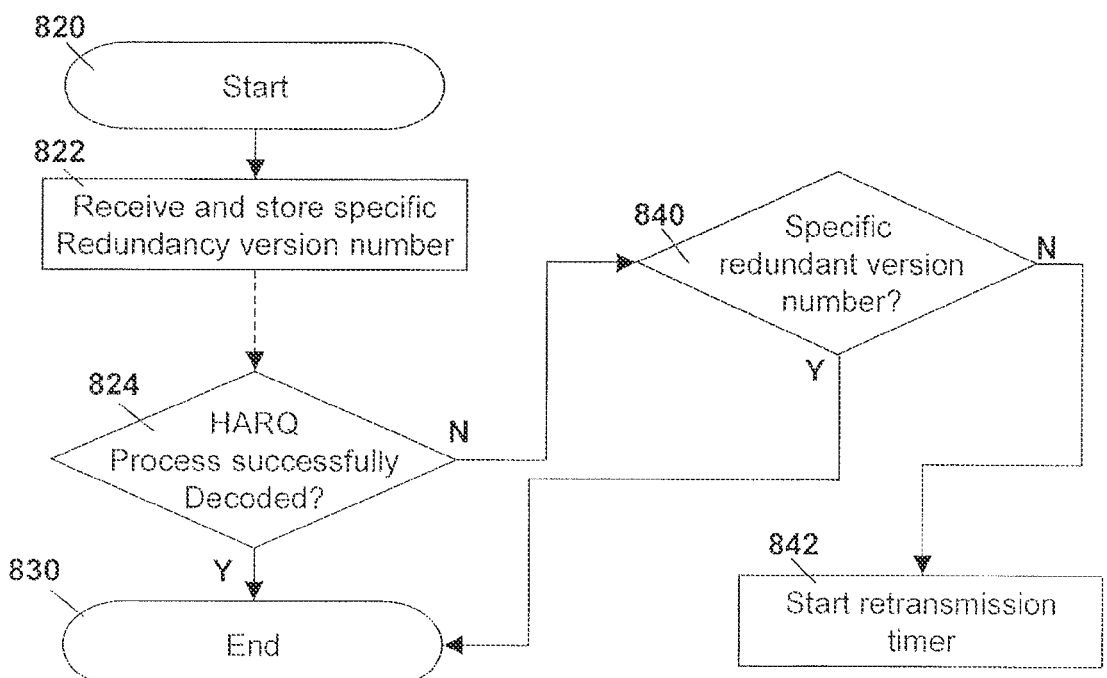
FIG. 8b is a flow chart showing a UE side method for determining whether to start a retransmission timer.

From the UE perspective reference is now made to FIG. 8b. On the UE side FIG. 8b starts at block 820 and proceeds to block 822 in which the UE receives and stores the redundant version number.

The process then proceeds and starts to decode HARQ processes. At block 824 a check is made to determine whether the particular HARQ process was successfully decoded. If yes, the process proceeds to block 830 and ends.

Conversely, from block 824 if the HARQ process was not successfully decoded the process proceeds to block 840 in which a check is made to determine whether the last HARQ process has a redundant version number that matches the specific redundancy version number received at block 822. If yes, the process proceeds to block 850 and ends. Conversely, the process proceeds to block 842 and starts the retransmission timer. Again, this prevents the starting of the retransmission timer if further retransmissions are not expected.

The various options above each present advantages with regard to the other options. The setting of a expiration value for the retransmission timer is easy to implement and requires minimal signaling.

Conversely, the sending of a DRX MAC CE prevents the start of the retransmission timer but requires further signaling. Similarly, the storing of the maximum number of downlink retransmissions or specific redundant version number prevents the retransmission timer from starting unnecessarily.

Figure 9:
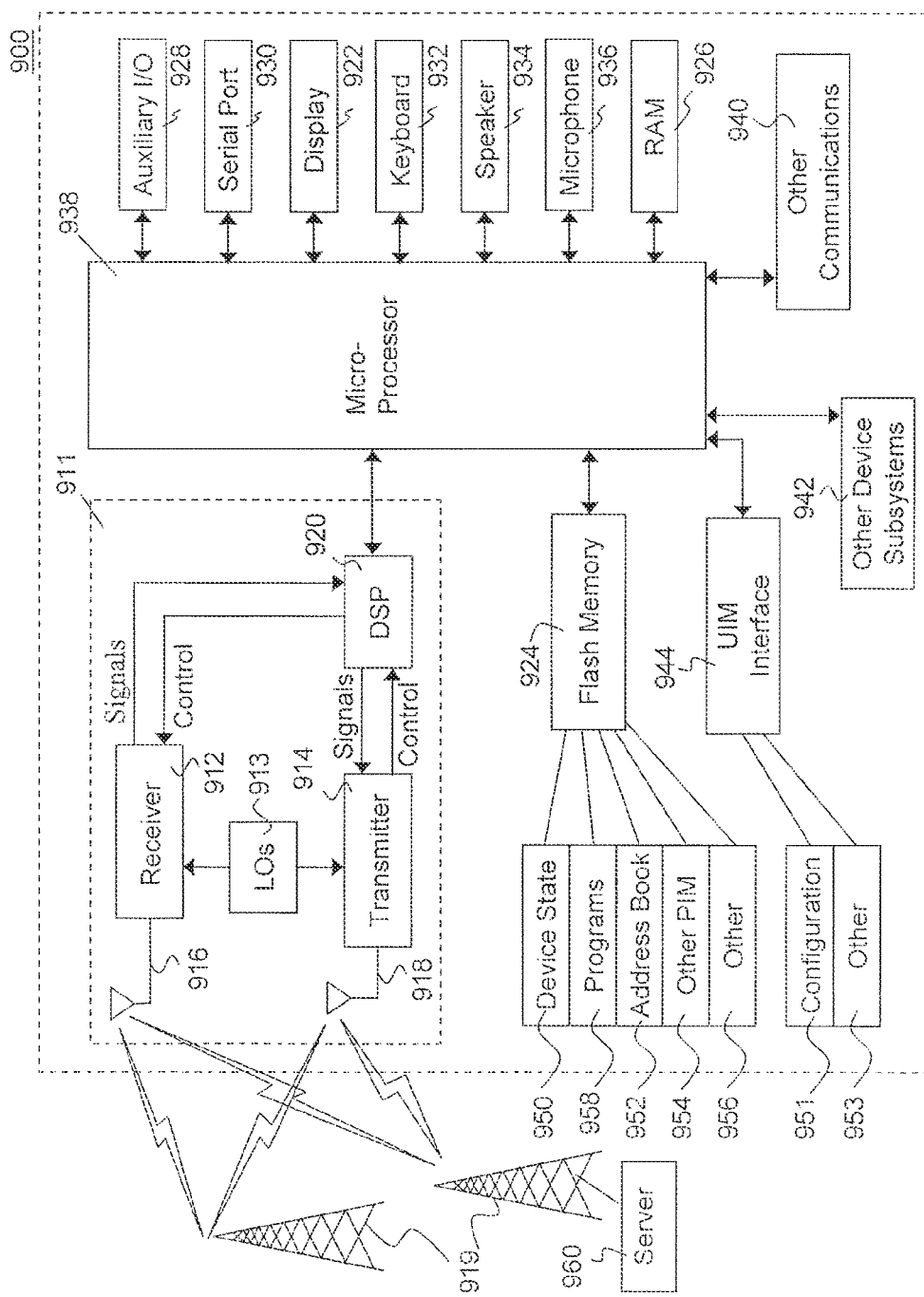

The above can be implemented on any UE. Such UEs include, but are not limited to, personal digital assistants, cellular telephones, wireless data devices, among others. Reference is now made to FIG. 9.

UE 900 is preferably a two-way wireless communication device having at least voice and data communication capabilities. UE 900 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where UE 900 is enabled for two-way communication, it will incorporate a communication subsystem 911, including both a receiver 912 and a transmitter 914, as well as associated components such as one or more, preferably embedded or internal, antenna elements 916 and 918, local oscillators (LOs) 913, and a processing module such as a digital signal processor (DSP) 920. As will be apparent to those skilled in the field of communications, the particular design of the communication subsystem 911 will be dependent upon the communication network in which the device is intended to operate. For example, UE 900 may include a communication subsystem 911 designed to operate within the LTE Network.

Network access requirements will also vary depending upon the type of network 919. For example, In UMTS and GPRS networks, network access is associated with a subscriber or user of UE 900. For example, a GPRS mobile device therefore requires a subscriber identity module (SIM) card in order to operate on a GPRS network. In UMTS and LTE a USIM or SIM module is required. In CDMA a RUIM card or module is required. These will be referred to as a UIM interface herein. Without a valid UIM interface, a mobile device may not be fully functional. Local or non-network communication functions, as well as legally required functions (if any) such as emergency calling, may be available, but mobile device 900 will be unable to carry out any other functions involving communications over the network 900. The UIM interface 944 is normally similar to a card-slot into which a card can be inserted and ejected like a diskette or PCMCIA card. The UIM card can have approximately 64K of memory and hold many key configuration 951, and other information 953 such as identification, and subscriber related information.

When required network registration or activation procedures have been completed, UE 900 may send and receive communication signals over the network 919. Signals received by antenna 916 through communication network 919 are input to receiver 912, which may perform such common receiver functions as signal amplification, frequency down conversion, filtering, channel selection and the like, and in the example system shown in FIG. 9, analog to digital (ND) conversion. A/D conversion of a received signal allows more complex communication functions such as demodulation and decoding to be performed in the DSP 920. In a similar manner, signals to be transmitted are processed, including modulation and encoding for example, by DSP 920 and input to transmitter 914 for digital to analog conversion, frequency up conversion, filtering, amplification and transmission over the communication network 919 via antenna 918. DSP 920 not only processes communication signals, but also provides for receiver and transmitter control. For example, the gains applied to communication signals in receiver 912 and transmitter 914 may be adaptively controlled through automatic gain control algorithms implemented in DSP 920.

Network 919 may further communicate with multiple systems, including a server 960 and other elements (not shown). For example, network 919 may communicate with both an enterprise system and a web client system in order to accommodate various clients with various service levels.

UE 900 preferably includes a microprocessor 938 which controls the overall operation of the device. Communication functions, including at least data communications, are performed through communication subsystem 911. Microprocessor 938 also interacts with further device subsystems such as the display 922, flash memory 924, random access memory (RAM) 926, auxiliary input/output (I/O) subsystems 928, serial port 930, keyboard 932, speaker 934, microphone 936, a short-range communications subsystem 940 and any other device subsystems generally designated as 942.

Some of the subsystems shown in FIG. 9 perform communication-related functions, whereas other subsystems may provide "resident" or on-device functions. Notably, some subsystems, such as keyboard 932 and display 922, for example, may be used for both communication-related functions, such as entering a text message for transmission over a communication network, and device-resident functions such as a calculator or task list.

Operating system software used by the microprocessor 938 is preferably stored in a persistent store such as flash memory 924, which may instead be a read-only memory (ROM) or similar storage element (not shown). Those skilled in the art will appreciate that the operating system, specific device applications, or parts thereof, may be temporarily loaded into a volatile memory such as RAM 926. Received communication signals may also be stored in RAM 926. Further, a unique identifier is also preferably stored in read-only memory.

As shown, flash memory 924 can be segregated into different areas for both computer programs 958 and program data storage 950, 952, 954 and 956. These different storage types indicate that each program can allocate a portion of flash memory 924 for their own data storage requirements. Microprocessor 938, in addition to its operating system functions, preferably enables execution of software applications on the mobile device. A predetermined set of applications that control basic operations, including at least data and voice communication applications for example, will normally be installed on UE 900 during manufacturing. A preferred software application may be a personal information manager (PIM) application having the ability to organize and manage data items relating to the user of the mobile device such as, but not limited to, e-mail, calendar events, voice mails, appointments, and task items. Naturally, one or more memory stores would be available on the mobile device to facilitate storage of PIM data items. Such PIM application would preferably have the ability to send and receive data items, via the wireless network 919. In a preferred embodiment, the PIM data items are seamlessly integrated, synchronized and updated, via the wireless network 919, with the mobile device user's corresponding data items stored or associated with a host computer system. Further applications may also be loaded onto the mobile device 900 through the network 919, an auxiliary I/O subsystem 928, serial port 930, short-range communications subsystem 940 or any other suitable subsystem 942, and installed by a user in the RAM 926 or preferably a non-volatile store (not shown) for execution by the microprocessor 938. Such flexibility in application installation increases the functionality of the device and may provide enhanced on-device functions, communication-related functions, or both. For example, secure communication applications may enable electronic commerce functions and other such financial transactions to be performed using the UE 900. These applications will however, according to the above, in many cases need to be approved by a carrier.

In a data communication mode, a received signal such as a text message or web page download will be processed by the communication subsystem 911 and input to the microprocessor 938, which preferably further processes the received signal for output to the display 922, or alternatively to an auxiliary I/O device 928. A user of UE 900 may also compose data items such as email messages for example, using the keyboard 932, which is preferably a complete alphanumeric keyboard or telephone-type keypad, in conjunction with the display 922 and possibly an auxiliary I/O device 928. Such composed items may then be transmitted over a communication network through the communication subsystem 911.

For voice communications, overall operation of UE 900 is similar, except that received signals would preferably be output to a speaker 934 and signals for transmission would be generated by a microphone 936. Alternative voice or audio I/O subsystems, such as a voice message recording subsystem, may also be implemented on UE 900. Although voice or audio signal output is preferably accomplished primarily through the speaker 934, display 922 may also be used to provide an indication of the identity of a calling party, the duration of a voice call, or other voice call related information for example.

Serial port 930 in FIG. 9 would normally be implemented in a personal digital assistant (PDA)-type mobile device for which synchronization with a user's desktop computer (not shown) may be desirable. Such a port 930 would enable a user to set preferences through an external device or software application and would extend the capabilities of mobile device 900 by providing for information or software downloads to UE 900 other than through a wireless communication network. The alternate download path may for example be used to load an encryption key onto the device through a direct and thus reliable and trusted connection to thereby enable secure device communication.

Alternatively, serial port 930 could be used for other communications, and could include as a universal serial bus (USB) port. An interface is associated with serial port 930.

Other communications subsystems 940, such as a short-range communications subsystem, is a further optional component which may provide for communication between UE 900 and different systems or devices, which need not necessarily be similar devices. For example, the subsystem 940 may include an infrared device and associated circuits and components or a Bluetooth™ communication module to provide for communication with similarly enabled systems and devices.

Figure 10:
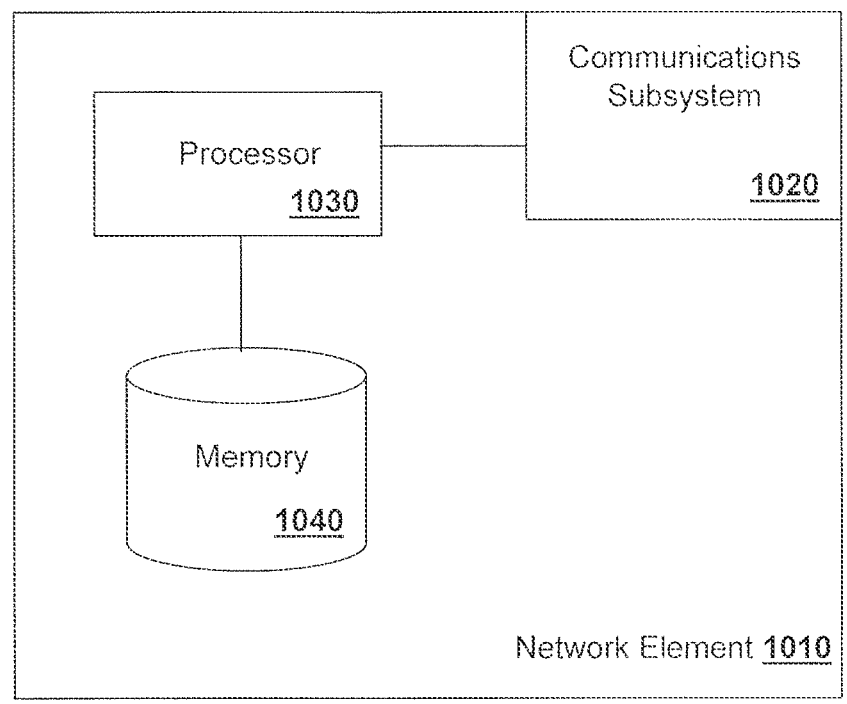
FIG. 10 is a block diagram of a simplified network element apt to be used with the present disclosure.

Reference is now made to FIG. 10. FIG. 10 illustrates the simplified network element adapted to make the decisions shown in FIGS. 3a, 4a, 5a, 6a, 7a and 8a above. Network element 1010 includes a communications subsystem 1020 adapted to communicate with user equipment. As will be appreciated by those skilled in the art communications subsystem 1020 does not need to directly communicate with user equipment, but could be part of a communications path for communications to and from the user equipment.

Network element 1010 further includes a processor 1030 and a storage 1040. Storage 1040 is adapted to store information for each user equipment being serviced by network element 1010. Processor 1030 is adapted to, provide information such as maximum number of retries, maximum redundant versions, DRX MAC CE, or expiration values by communications subsystem 1920.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

We claim:

1. A method for configuring a discontinuous reception (DRX) period for a user equipment from an evolved Node B (eNB) comprising:
    determining whether a precondition has been met, wherein the precondition is at least one of a low traffic volume for the user equipment, a lack of uplink and downlink transmissions for the user equipment, or a likely transition of the user equipment to another cell;
    when the precondition has been met, send a medium access control (MAC) control element for a long DRX period; and
    when the precondition has not been met, maintaining a short DRX period.

2. The method of claim 1, wherein the maintaining step utilizes a preconfigured DRX configuration on the user equipment.

3. An evolved Node B, comprising:
    a communication system;
    a memory; and
    a processor configured to:
        configure a discontinuous reception (DRX) mode for a user equipment;
        determine whether a precondition has been met, wherein the precondition is at least one of a low traffic volume for the user equipment, a lack of uplink and downlink transmissions for the user equipment, or a likely transition of the user equipment to another cell;
    when the precondition has been met, send, through the communications subsystem, a medium access control (MAC) control element for a long DRX period; and
    when the precondition has not been met, maintain a short DRX period.

4. The evolved Node B of claim 3, wherein the processor is configured to use a preconfigured DRX configuration on the user equipment to maintain the short DRX period.

5. The method of claim 1, wherein the MAC control element is identified by a logical channel identifier (ID) value.

6. The method of claim 1, wherein the evolved Node B operates in a long term evolution (LTE) infrastructure.

7. The method of claim 1, wherein the short DRX period comprises a short DRX cycle.

8. The method of claim 1, wherein the long DRX period comprises a long DRX cycle.

9. The evolved Node B of claim 3, wherein the MAC control element is identified by a logical channel identifier (ID) value.

10. The evolved Node B of claim 3, wherein evolved Node B operates in a long term evolution (LTE) infrastructure.

11. The evolved Node B of claim 3, wherein the short DRX period comprises a short DRX cycle.

12. The evolved Node B of claim 3, wherein the long DRX period comprises a long DRX cycle.

13. An apparatus comprising instructions embodied on a tangible, non-transitory computer-readable medium, the instructions operable when executed to cause a computing system to perform operations comprising:
    determining whether a precondition has been met, wherein the precondition is at least one of a low traffic volume for the user equipment, a lack of uplink and downlink transmissions for the user equipment, or a likely transition of the user equipment to another cell;
    when the precondition has been met, send a medium access control (MAC) control element for a long DRX period; and
    when the precondition has not been met, maintaining a short DRX period.

14. The apparatus of claim 13, wherein the maintaining step utilizes a preconfigured DRX configuration on the user equipment.

15. The apparatus of claim 13, wherein the MAC control element is identified by a logical channel identifier (ID) value.

16. The apparatus of claim 13, wherein the short DRX period comprises a short DRX cycle.

17. The apparatus of claim 13, wherein the long DRX period comprises a long DRX cycle.

* * * * *